United States Patent [19]

Wilt

[11] 3,745,450

[45] July 10, 1973

[54] METAL DETECTION SYSTEM FOR INDICATING THE MOTION AND DIRECTION OF MOTION OF A BODY HAVING MAGNETIC PROPERTIES

[75] Inventor: Marvin Duane Wilt, Dallas, Tex.

[73] Assignee: Teledyne Industries, Inc., Dallas, Tex.

[22] Filed: Oct. 27, 1971

[21] Appl. No.: 192,822

[52] U.S. Cl. .................. 324/41, 340/38 L, 340/39, 340/258 C
[51] Int. Cl. ............................................. G01r 33/00
[58] Field of Search ............................. 324/41, 340; 340/38 L, 39, 258 R, 258 C

[56] References Cited
UNITED STATES PATENTS
2,441,554  5/1948  Barker .................................. 340/39

FOREIGN PATENTS OR APPLICATIONS
464,880  5/1950  Canada ................................ 340/39
1,204,484  9/1970  Great Britain ..................... 340/38 R Primary Examiner—Robert J. Corcoran
Attorney—Arthur E. Dowell, Jr. et al.

[57] ABSTRACT

A passive-loop detector system responsive to disturbances of the magnetic fields cutting spaced detection loops when they are sequentially traversed by a body having magnetic properties, the system being operative to indicate motion thereof in either direction and also being operative to indicate motion of the body in only one selected direction, the system using electronic circuitry having separate signal channels connected with the spaced detection loops and these channels having different time-constants and having their outputs combined such that when the loop in the longer time-constant channel responds first, it can hold its output signal long enough for the shorter time constant channel to have its output ANDed therewith to provide an indication, but not vice-versa.

4 Claims, 1 Drawing Figure

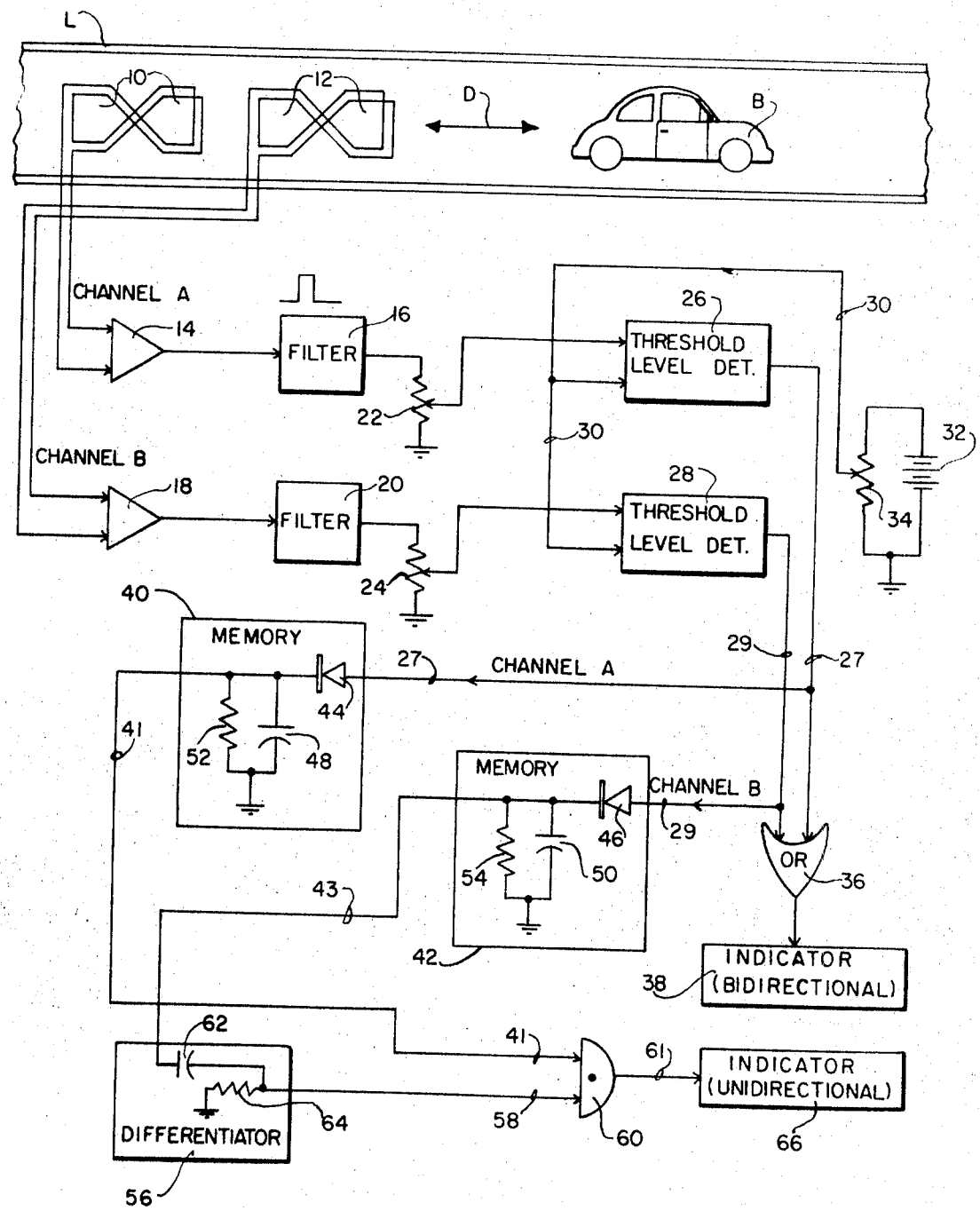

METAL DETECTION SYSTEM FOR INDICATING THE MOTION AND DIRECTION OF MOTION OF A BODY HAVING MAGNETIC PROPERTIES

This invention relates to detector systems for detecting and indicating the motion of a body having magnetic properties when it passes one or more pick-up loops which serve as input devices for the system, and more particularly relates to a detector system capable of directional motion determinations based on the sequence in which the loops are traversed.

Systems of this general type are suitable for many different uses, for instance, vehicle surveillance, traffic control, and the detection of vehicular presence in areas such as service station driveways or unattended parking lots, as well as non-vehicular surveillance and/or detection of intrusions, such as for the purpose of detecting the entry of a person carrying a magnet into a computer memory-bank area. The prior art lists a number of other uses to which a system of this general type can be put, and in general divides the detecting loop circuitry itself into several diverse categories, including active-loop systems in which the loops can be included in oscillator tank circuits to drag the frequency of oscillation when a change occurs in magnetic fields cutting the loop, and including passive-loop systems in which the loops detect changes in ambient magnetic fields attributable, for instance, to alteration of the Earth's field by intrusion of a permeable body, or motion of a magnetized body near the loop.

The present invention is of the passive-loop type in order to take advantage of the greater natural stability of such systems which do not require the tuning of components such as the oscillators and resonant circuits employed in active systems. The invention is described herein with reference to an illustrative embodiment particularly well adapted for detecting vehicles passing over two loops disposed in spaced relationship in the roadway in such a manner that the vehicle passes over a first loop, and then over a second loop, sequentially. An electronic system is provided which delivers two different types of outputs, one type being a bidirectional output which merely indicates the passage of a vehicle regardless of the direction in which it was travelling, and the other output being unidirectional in nature and being obtained in such a way that an output indication occurs in response to vehicles travelling in only one of two selectable directions. The loops employed in the preferred working embodiment of the present system have multiple turns and are electrostatically shielded, although single turn loops, and loops with or without shielding, are also within the scope of the present disclosure.

It is a principle object of this invention to provide a system for electronically detecting the passage of bodies having magnetic properties adjacent to passive detecting loops as set forth above, while providing novel means for determining the direction in which the passing object was travelling. It is a corollary object of this invention to provide an electronic system having memory means operative to eliminate multiple pulses which might occur in rapid succession as a result of the same object having differing magnetic properties at different locations along its length, the time constants of the memories being selected such that the system operates on a leading-edge sensitive basis and thereby eliminates magnetic information which might be generated by different portions of the same passing magnetic body, especially where the body is fairly large such as a vehicle.

It is another major object of the invention to provide in each channel band-limited amplifier means operative to eliminate certain unwanted types of disturbances without at the same time attenuating useful information-bearing signals. More particularly input loop signals are passed through amplifier means and then through band-pass filter means which, in the vehicle detection embodiment, have band-pass characteristics in the range of 2-10 hertz. The upper cutoff frequency of approximately 10 hertz is desirable to eliminate interference from 60 hertz power lines, whereas the lower-frequency cutoff of 2 hertz is designed to eliminate effects caused by DC drift in the amplifiers or caused by such natural phenomena as storms in the Earth's magnetic field.

Still another object of the invention is to include signal-level threshold detector means wherein the filtered signals in the several channels are compared with an adjustable reference level, and the remainder of the electronic system is responsive only to picked-up signals having substantial levels, namely sufficient to exceed the predetermined threshold. Adjustment of the threshold is then used to eliminate signals attributable to objects whose magnetic properties are significantly smaller than those which are of interest, for instance the elimination of small-object tripping of a vehicle detector system.

Another object of the invention is to provide detection loops which are laid in the form of a figure 8, thereby further to eliminate spurious responses to power-line frequencies, i.e., 60 Hertz. Moreover, although a figure 8 loop will provide dual oppositely-directed pulses when its separate winding zones are traversed by a magnetic object, the above mentioned threshold detectors are responsive only to pulses in one polarity direction and therefore operate to eliminate the dual nature of the input from each of the figure 8 loops.

It is another important object of this invention to provide a two-loop system capable of detecting traffic passing thereover in only one of two sequential directions by employing a long time-constant in the memory of the loop channel which is to be traversed first, and then providing a leading-edge detection characteristic for the other channel whose loop is to be traversed second when traffic is moving in the preferred direction, and the system then serving to determine whether the second loop delivered a leading edge detection signal before the memory of the vehicle passage contained in the first loop channel was dissipated. The two signals are then ANDed together to provide a unidirectional indication when a vehicle moves from the first loop to the second loop. Conversely, vehicles moving in the opposite direction will fail to actuate the AND gate because when the brief leading edge signal occurs first it will disappear before the longer time constant memory signal occurs in the other channel as a result of the loops being traversed in the wrong sequence.

Other objects and advantages of the invention will become apparent during the following discussion of the drawing, which is a block diagram of a system according to the present invention.

Referring now to the drawing, the block diagram shows an embodiment including two separate channels, comprising a first channel A driven by a first loop 10 buried in the ground, and a second channel B driven by a second loop 12 also buried in the ground and disposed along a highway lane L in spaced relationship with respect to the first loop, such that a moving body B representing for example vehicular traffic traverses the two loops successively but in different sequence depending on whether the traffic is travelling to the right or to the left, these directions of traffic being indicated by the arrow D. The two channel inputs are similar but their output circuitry differs in order to provide direction-sensitive indications. The loop 10 feeds an amplifier 14 which puts out an amplified signal into a band-pass filter 16 which, as stated above, has a narrow low-frequency band-pass characteristic of approximately 2–10 hertz. Thus, the output from the filter 16 is of very limited frequency content, but may be quite large in amplitude depending upon the size of the magnetic field disturbances viewed by the loop 10. The amplifier 18 and the bandpass filter 20 are identical to the corresponding components 14 and 16 except that they are located in channel B and driven by the loop 12.

The filters 16 and 20 respectively deliver their outputs to potentiometers 22 and 24 which are respectively adjustable to provide a signal on the upper input of each two separate threshold level detectors 26 and 28. The lower input to each of the threshold level detectors comprises a reference level appearing on wire 30 from an adjustable source which for illustrative purposes comprises a battery 32 across a potentiometer 34. By adjustment of the potentiometer 34, the threshold level at which each of the detectors 26 and 28 will pass an incoming loop signal from the associated potentiometer 22 or 24 can be determined. The gain in each of the channels A and B coupled to the detectors 26 and 28 can be balanced so as to provide both channels with equal sensitivity. Matching of the channels is accomplished by suitable adjustment of the potentiometers 22 and 24 relative to each other, whereas the mutual levels of adjustment of these two potentiometers as compared with the preset position of the reference level potentiometer 34 determines the sensitivity of the system with regard to the magnitude of a disturbance in the magnetic fields through the loops 10 and 12 required to produce an output from the system.

The outputs of the two threshold level detectors appearing on wires 27 and 29 are both delivered to an OR gate 36 whose output is then used to trigger an indicator 38 which shows when an adequate disturbance has occurred in either channel loop 10 or 12, thereby providing bidirectional indication that the magnetic field in at least one of the loops has been disturbed.

These same outputs on wires 27 and 29 are also delivered to two different memory devices 40 and 42. Both memory devices are substantially identical to each other, and both have a time constant which is selected according to the needs of a particular application of the system. In the vehicular traffic embodiment of the invention being described herein, a time constant of one second is employed in each of the memory devices 40 and 42 which time constant is sufficient to eliminate multiple pulses caused in the same loop by the same vehicle, while at the same time being short enough to permit the pulse caused by one vehicle to be dissipated from the memory capacitor before a subsequent vehicle has a chance to enter the detection loops. The memory circuits 40 and 42 each contain a diode, such as the diodes 44 and 46, which serves to charge an associated time constant capacitor, such as the capacitors 48 and 50, in one direction only thereby to store in the charged capacitor a pulse indication of the arrival of an intrusion event. The time constant of the memory device in each case is partly determined by a resistor, such as the resistors 52 or 54. The product of the value of this resistor and the value of the associated storage capacitor provides the one-second time constant.

The output from the memory device 40 in channel A appears on wire 41 and is delivered directly to an AND gate 60 to enable one input thereof for the duration of the one-second time constant of the memory device 40. On the other hand, the output of the memory device 42 in channel B is delivered on wire 43 to a differentiator circuit 56 which includes a series capacitor 62 and a shunt resistor 64 whose time constant is relatively shorter, namely 20 milliseconds in the embodiment of the vehicular detector system being described herein. The differentiator circuit then provides a brief output on wire 58 which is delivered to the other input of the AND gate 60, but because of the short time constant of the differentiator circuit 56 the brief pulse appearing on the wire 58 coincides in real time only with the leading edge of the intrusion event signalled to the memory circuit 42 via the wire 29 from the threshold level detector 28 in channel B.

Thus, the inputs to the AND gate 60 on the wires 41 and 58 are quite different in duration. For each significant intrusion event picked up by both loops 10 and 12 the pulse on wire 41 persists for about 1 second, whereas the event appearing on wire 58 lasts for only 20 milliseconds. Therefore it will be necessary for the vehicle to pass from left to right over the loops by first traversing channel A loop 10 and then traversing channel B loop 12 within one second in order to provide simultaneous enabling inputs to the AND gate 60. A vehicle passing over loop 12 in channel B first would not have time to pass over the channel A loop 10 before the differentiated pulse on wire 58 disappeared, and therefore the vehicle passing from right to left would not provide an output from the AND gate 60 on wire 61. When it occurs, the output from the AND gate 60 is delivered to a unidirectional indicator 66 which is actuated as just described to provide indication where the loop in channel A is traversed before the loop in channel B. Obviously, suitable switching (not shown) can be provided for reversing the connections of the loops to the two different channels so that the system can be selectively adapted to be sensitive to either direction of travel of a vehicle.

The time constants of one-second and 20-milliseconds as described above are suitable for normal vehicular traffic speeds, but can of course be altered to be useful in other special situations where the bodies B having magnetic properties are travelling at significantly higher or at significantly lower rates than normal traffic speeds. The present example is intended merely to illustrate one practical embodiment of the invention. The intrusion indicators 38 and 66 are not described in detail, but may include any suitable means such as a light, a buzzer, a bell, or some more sophisticated type of indication means, of which many suitable types are shown in the prior art.

The present invention is not to be limited to the exact form shown in the drawing for obviously changes may be made therein within the scope of the following claims.

I claim:

1. A system for detecting and indicating the motion and direction of motion of a body having magnetic properties by detecting changes in the ambient magnetic field caused by the intrusion thereinto of the body, comprising:
   a. first and second loop means disposed in the ambient field in spaced relationship along the path of motion of the body so that the latter traverses these loop means sequentially, each loop means comprising a figure-eight winding in which the two halves of the figure-eight are wound in opposite directions and are oriented along the path of motion such that said body traverses the respective halves sequentially;
   b. first and second electronic channels respectively connected to said loop means to separately amplify signals from the loop means resulting from said changes in the fields thereat;
   c. memory means in each channel and each having an integrating time constant during which it stores a portion of the signal from its associated loop means;
   d. each of said channels including between the associated loop means and its memory means an amplifier and a band pass filter, and each channel including means for relatively adjusting the amplitudes of the signals in the channels, and each channel including threshold detector means connected to receive said signals, to compare their amplitudes with preset threshold levels, and to pass signals to said memory means when the threshold levels are exceeded;
   e. an AND gate having a first input connected to the memory means in the first channel, and having a second input;
   f. differentiator means coupling the second input to the second memory means, the time constant of the differentiator means being short as compared with that of the first memory means; and
   g. unidirectional indicator means coupled to the AND gate and operative to indicate the passage of a body in such a direction as to intersect the first and second loop means in that order.

2. In a system as set forth in claim 1, said loop means being disposed in a roadway for detecting the motion of vehicles, and said band pass filters having a pass characteristic falling with a range of frequencies extending from about 2 hertz to about 10 hertz.

3. In a system as set forth in claim 2, each memory means having a time constant of about one second, and the differentiator means having a time constant of about 20 milliseconds.

4. In a system as set forth in claim 1, each memory means comprising means for rectifying the signals from the loop means in the associated channel, a storage capacitor connected to be charged by said rectified signals, and a resistor connected across the capacitor, the capacitor and resistor determining the time constant of the memory means.

* * * * *